UNITED STATES PATENT OFFICE.

JAMES ASTON, OF PITTSBURGH, PENNSYLVANIA, ASSIGNOR TO A. M. BYERS COMPANY, OF PITTSBURGH, PENNSYLVANIA.

MANUFACTURE OF WROUGHT-IRON.

14,457. Specification of Reissued Letters Patent. Reissued Apr. 2, 1918.

No Drawing. Original No. 1,255,499, dated February 5, 1918, Serial No. 186,830, filed August 18, 1917. Application for reissue filed February 19, 1918. Serial No. 218,168.

*To all whom it may concern:*

Be it known that I, JAMES ASTON, a resident of Pittsburgh, Allegheny county, Pennsylvania, have invented a new and useful Improvement in the Manufacture of Wrought-Iron, of which the following is a full, clear, and exact description.

Heretofore the usual method employed in the manufacture of wrought iron has been the puddling process which consists in refining pig iron in a puddling or reverberatory furnace to substantially remove the carbon, sulfur, manganese and phosphorus from the iron; and then when the molten metal begins to lose its fluidity or comes to nature in the form of a pasty mass, this mass is worked in its bath of slag, whereby the slag remains incorporated with the iron. A ball is thus formed which is removed from the furnace and taken to a squeezer and thence to rolls, producing blooms, billets or muck-bars of wrought iron. The chief objections to this process are that skilled labor is required, the operation is slow and tedious, and only a small amount of wrought iron can be produced at each heat.

The purpose of my invention is to dispense with the skilled labor required in the puddling process and to lessen the time ordinarily required in the production of wrought iron.

My invention utilizes pig iron which has been refined by ordinary steel-making processes, such as the Bessemer or open-hearth process, this refined product being poured in molten condition, so that the slag is substantially separated from it. I take such a refined product in comminuted or disintegrated form and mechanically mix it with a silicate or other suitable slag, raising the slag and refined product to the welding heat of the metal, work it into ball form, and work the mass in the same way as in the present puddling operation.

This may be accomplished by placing fagots or bundles of wire or shavings and chips of the refined product in a bath of molten iron silicate slag in a suitable furnace, and allowing the metal to remain in the molten slag until it has attained a welding heat, and then removing the fagot or bundle with the adhering slag, and squeezing or rolling the same in the manner commonly employed with puddled balls in the ordinary puddling operation.

I will now describe my invention more fully, so that others skilled in the art to which it pertains may practise it.

Metal produced from pig iron by ordinary steel-making processes, such as the Bessemer or open-hearth process, and which is substantially slagless, on account of being molten at the end of the refining operation, is disintegrated in any desirable way, as for example, by any suitable milling operation that produces chips or shavings. These chips or shavings are formed into a bundle and placed in a molten bath of silicate slag in a suitable furnace, where the metal is allowed to remain in the bath until it has attained a welding heat. The metal is then collected together into a mass in the slag, and this mass, with the adhering slag, is then removed from the furnace and taken to the squeezer where it is formed into blooms in the usual manner.

Instead of forming the chips and shavings into bundles, they may be fed into the slag loosely and after the metal has come to a welding heat, it can be formed into a ball in the slag by means of a suitable tool. Or instead of using chips or shavings, fagots may be formed of rods into the interstices of which the slag of the bath will flow. Or, under certain conditions, the cold slag or slag-forming material and the comminuted or disintegrated substantially slagless material may be placed on the hearth of the furnace together, as the heat required to bring the slag to a molten state will at the same time bring the iron to a welding heat.

Other forms of the disintegrated refined metal may be employed. Although I have described heating the metal in the bath of molten slag, I do not desire to limit myself thereto, as the metal may be brought to a welding heat before it is mingled with the slag. Nor do I desire to limit myself to a silicate slag, as in certain cases other forms of slag may be desirable.

The advantages of my invention are that the refining of metal, which may be accomplished in larger unit quantities, is separate from the operation which incorporates the silicate slag or other slag with the previously refined metal; and larger quantities of metal may be treated by my process at one heat than can be puddled at one time. The result of this is a great saving in time and labor.

By utilizing refined steel, which is molten after refining, I eliminate or greatly reduce the time required in ordinary puddling to substantially remove the impurities of the pig iron; while by mechanically mixing such material, which is substantially slagless, with a proper slag and bringing the metal to a welding heat, I obtain a mass or ball which, when worked down, shows all of the characteristics of high grade wrought iron, so far as can be determined by physical and chemical tests.

Having thus described my invention, what I claim and desire to secure by Letters Patent is:

1. The method of producing wrought iron, consisting in bringing the substantially slagless product of a steel-making process to a welding heat in a silicate bath, and then squeezing and rolling the mingled slag and iron.

2. The method of producing wrought iron, consisting in heating the disintegrated substantially slagless product of a steel-making process when mingled with slag to a welding heat, and then squeezing and rolling the same.

3. The method of producing wrought iron, consisting in mingling the disintegrated substantially slagless product of a steel-making process and molten slag, the point of fusion of which is lower than that of iron, and then squeezing and working the metal at a welding heat to a product.

4. The method of producing wrought iron, consisting in mixing the substantially slagless refined product of a steel-making process, with separately formed iron silicate slag or iron silicate slag-making material, bringing the metal to a welding heat in the molten slag, forming the metal into a mass, and then removing and squeezing and working the same.

5. The method of making wrought iron, consisting in mixing a comminuted metal product, the major amount of which consists of the substantially slagless product of a steel-making operation, with separately formed iron silicate slag or slag-forming material, bringing the metal to welding temperature, forming into a mass in the bath of molten slag, and then removing the mass and squeezing or working it.

In testimony whereof, I have hereunto set my hand.

JAMES ASTON.